United States Patent [19]
Maltby

[11] Patent Number: 5,835,454
[45] Date of Patent: Nov. 10, 1998

[54] TRANSDUCER SHROUD FOR IMPROVED TRANSDUCER OPERATION IN THE TREATMENT OF WASTE WATER

[75] Inventor: Frederick L. Maltby, Jenkintown, Pa.

[73] Assignee: Drexelbrook Controls, Inc., Horsham, Pa.

[21] Appl. No.: 782,660

[22] Filed: Jan. 14, 1997

[51] Int. Cl.$^6$ .................................................. H04R 17/00
[52] U.S. Cl. .................... 367/165; 367/908; 367/191; 340/621; 588/227; 422/20; 422/128
[58] Field of Search ..................... 367/165, 908, 367/191, 152; 340/621; 310/323, 336, 337, 340; 588/227, 222, 225, 212, 210; 422/20, 127, 128

[56] References Cited

U.S. PATENT DOCUMENTS

| | | | |
|---|---|---|---|
| 4,343,185 | 8/1982 | Knute | 374/158 |
| 4,462,409 | 7/1984 | Pace et al. | 128/675 |
| 4,551,647 | 11/1985 | Day | 310/335 |
| 4,769,793 | 9/1988 | Kniest et al. | 367/99 |
| 4,802,458 | 2/1989 | Finsterwald et al. | 128/661.08 |
| 4,863,644 | 9/1989 | Harrington et al. | 261/77 |
| 4,912,686 | 3/1990 | Craster | 367/140 |
| 4,940,902 | 7/1990 | Mechalas et al. | 250/573 |
| 4,989,783 | 2/1991 | Douglas | 239/77 |
| 5,056,069 | 10/1991 | Granz et al. | 367/164 |
| 5,334,239 | 8/1994 | Choe et al. | 95/261 |
| 5,377,627 | 1/1995 | Andersson | 122/4 D |
| 5,546,947 | 8/1996 | Yagami et al. | 128/662.06 |
| 5,636,182 | 6/1997 | Suzuki et al. | 367/165 |

*Primary Examiner*—J. Woodrow Eldred
*Attorney, Agent, or Firm*—Woodcock Washburn Kurtz Mackiewicz & Norris LLP

[57] ABSTRACT

A sonic transducer shroud is shaped to present an inclined surface to rising bubbles and other matter during water treatment. Attached to the face of the sonic transducer, the shroud prevents the bubbles and other matter from being trapped on the transducer measurement surface and subsequently interfering with echo reception. The shroud has acoustic properties that are matched to the water such that the shroud is substantially acoustically transparent.

14 Claims, 3 Drawing Sheets

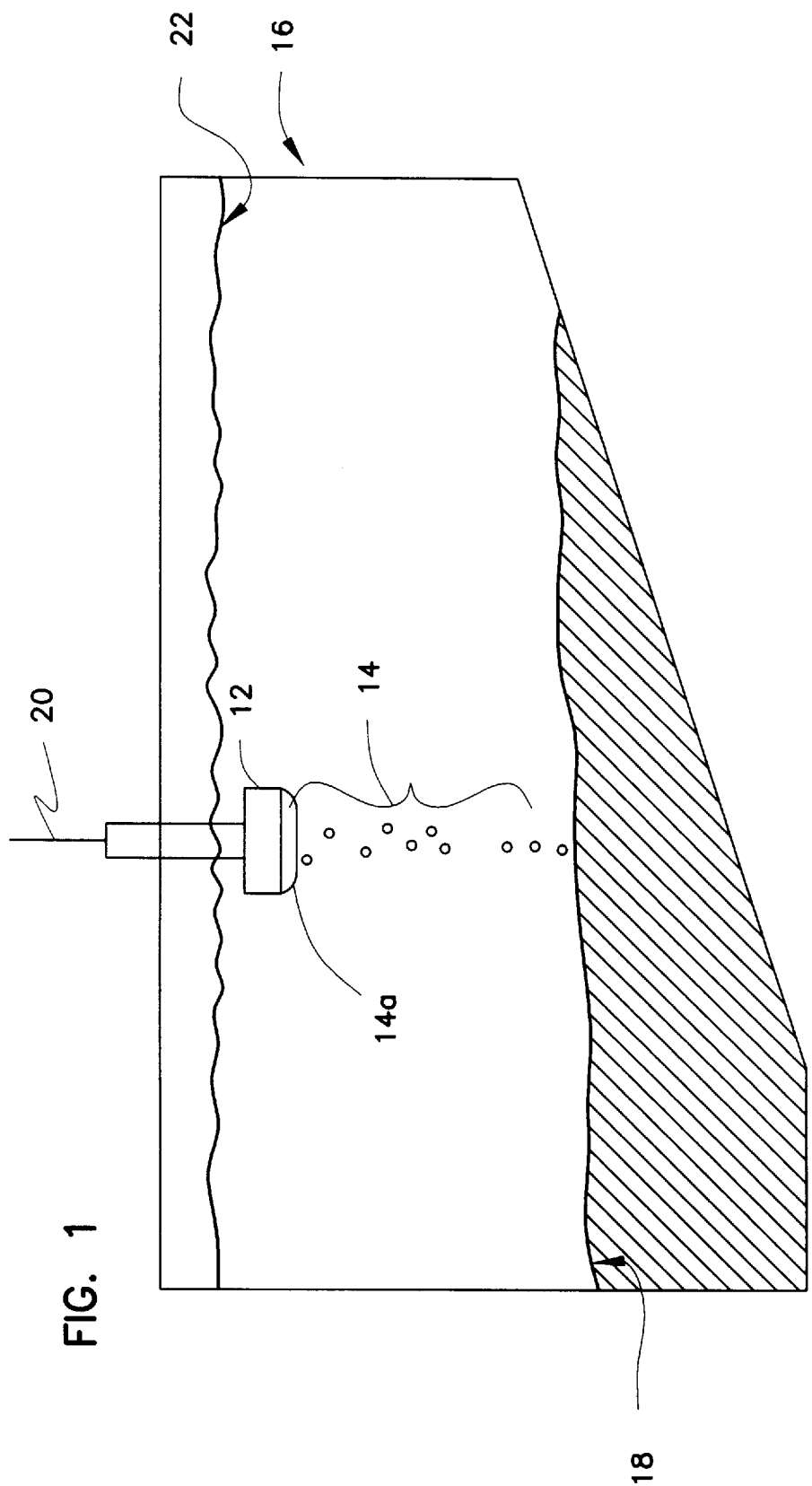

_5,835,454_

TRANSDUCER SHROUD FOR IMPROVED TRANSDUCER OPERATION IN THE TREATMENT OF WASTE WATER

FIELD OF THE INVENTION

The invention relates to sonic transducers for use in the treatment of water. More particularly, the invention relates to a cover for preventing gas bubbles and other matter from sticking to the surface of a transducer during its use in a water treatment plant.

BACKGROUND OF THE INVENTION

A process of removing semi-solid material from water, often referred to as waste water treatment, is used to treat waste water from manufacturing processes, sewage and the like. To that end, a variety of techniques have been developed and used in the treatment of waste water. One popular technique incorporates a settling tank that separates semi-solid material (popularly known as sludge) from the water via gravity. Using this technique, the waste water (influent) enters a tank, wherein the sludge is encouraged to settle to the bottom. As the sludge settles, sludge layers form in the tank, with the densest layers disposed toward the bottom.

Controlling such water treatment systems often entails taking a variety of measurements of the sludge and other water quality factors. Sonic transducers have been used in a variety of water treatment tank measurement devices. In co-pending, commonly assigned U.S. patent application Ser. No. 08/741408 filed on Oct. 29, 1996, method and apparatus are described for measuring sludge blankets and clarity in water treatment plants via sonic transducers. As described therein, the sonic transducer is at least partially submerged in the water where the measurements are being taken. Applicants have recognized that this submersion of the transducer exposes the surface of the transducer to elements in the water. Of particular concern in the case of sludge treatment, gas is produced in the sludge layers that rises as bubbles in the water. Rising gas bubbles that attach to the transducer surface interfere with the accuracy of the transducer. Similar bubble problems exist in water treatment facilities wherein dissolved oxygen may produce gas bubbles.

Others have recognized that exposure of a transducer transmission and reception mechanism to the elements in waste water could effect the operation of transducers. U.S. Pat. No. 4,940,902 issued to Mechalas et al. discloses a wiping mechanism that reciprocates over a light sensing probe and clears the surface of buildup. Mechalas purports to have recognized that constant exposure to waste water would cause a film to buildup on the surface of a light source and light sensor. By providing a periodic wiping of the respective transducer surfaces the accuracy of the measurement is said to improve. Unfortunately, the Mechalas mechanism requires constant maintenance and energy. As such, system costs are increased and system failure is more likely.

Thus, Applicants have recognized that there is a need for a passive device that could effectively shed bubbles or other rising matter from a transducer surface exposed to waste water.

SUMMARY OF THE INVENTION

The present invention meets the needs above by providing an apparatus for use in connection with a sonic transducer used in the treatment of water. The apparatus shrouds the transducer measurement surface with a cover having at least one inclined surface. Bubbles and other matter rising through the water strike the cover and are directed away from the transducer surface.

According to an aspect of the invention, the shroud comprises a conical, pyramidal, hemispherical or wedge shape. The shroud is formed of material that is substantially acoustically transparent in the tank liquid. For example, the shroud could comprise acoustical rubber. Alternatively, the shroud could be formed of a shell, such as polyvinyl chloride, and filled with a substantially acoustically transparent material. The use of a shell permits the filling to comprise a liquid, such as water, as well as the other substantially acoustically transparent materials, such as beeswax.

The inclined surface, whether conic, pyramidal, wedge or the like, presents an attack angle to the rising matter (e.g., gas). In the presently preferred embodiment, that attack angle is in the range of 15 to 25 degrees.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed.

In the drawings:

FIG. 1 is a pictorial representation of a portion of a water tank employing a sonic transducer;

DETAILED DESCRIPTION OF A PREFERRED EMBODIMENT

Figure 4:
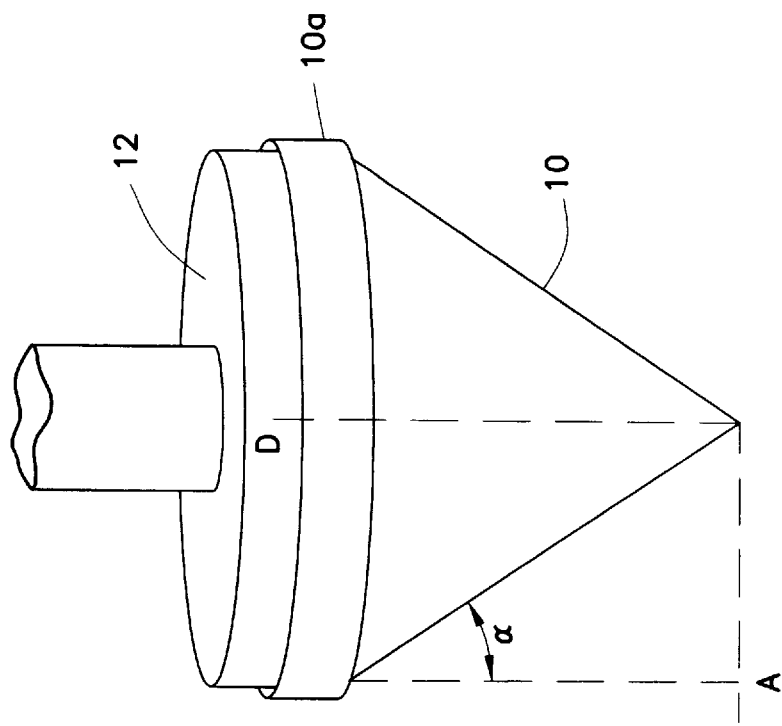

According to a presently preferred embodiment a sonic transducer shroud for use in a water treatment system will now be described with reference to the FIGURES. It will be appreciated by those of ordinary skill in the art that the description given herein with respect to those FIGURES is for exemplary purposes only and is not intended in any way to limit the scope of the invention. For example, the transducer shroud will be described herein with reference to a waste water treatment plant. However, such exemplary use of the transducer shroud is merely for the purpose of clearly describing the present invention and in not intended as a limitation, except as expressly specified in the appended claims.

Referring now to FIG. 1, a water tank 10 having sludge layers 18 is depicted. Such a tank may be used in a variety of water treatment processes. For example, the water tank 10 may be a clarifier for use in the treatment of waste water. In such a case, sludge layers 18 settle to the bottom of the clarifier. Transducer 12 generates a sonic pulse (not shown), which is directed at sludge layers 18. The sonic pulse then travels through the waste water of tank 16 in a direction substantially perpendicular to water level 22. During its travel through the water, the sonic pulse encounters a variety of impedances, depending upon the varying sludge concentrations in the water. As the sonic pulse 14 experiences changes in the sludge concentration at various points, a corresponding change in impedance is experienced by the sonic pulse. Consequently, a portion of the sonic pulse reflects back in the general direction of transducer 12. The reflected pulse results in an echo (not shown), which is received by transducer 12. The energy in the echo excites transducer 12, which in turn, converts the echo into an electrical signal. The electrical signal is then provided to a controller via conductor 20 for processing.

Transducer 12 is positioned in the water tank one to two inches below the water level to couple the sonic energy with the liquid medium under consideration. The air/water interface 22 represents a sharp change in impedance. As a result, a transducer positioned above air/water interface 22 would receive a large echo from interface 22, greatly increasing the difficulty of measuring activity within the water. By contrast, a transducer positioned below interface 22 will avoid the major impedance change that occurs at interface 22, increasing the measurement accuracy. However, positioning transducer 12 below air/water interface 22 has the unfortunate side-effect of exposing transducer 12 to elements in the water.

One significant transducer exposure problem is created by gas bubbles and other matter that rise up through the water in tank 16. As these bubbles and such, represented by bubbles 14 in the FIGURE, rise through the water, some of them may strike the transducer measurement surface and stick, creating a gas buildup 14a as indicated in the FIGURE. Thereafter, the gas buildup 14a will remain on the transducer surface until it dissolves or is otherwise dislodged from the transducer surface. Furthermore, after a sufficient amount of buildup, gas buildup (e.g., 14a) will become a high impedance interface, reducing the transmission of sonic pulses and the reception of desired echo signals. As a result, the accuracy of any subsequent measurements will be compromised and the effectiveness of the entire water treatment system may suffer.

Figure 2:
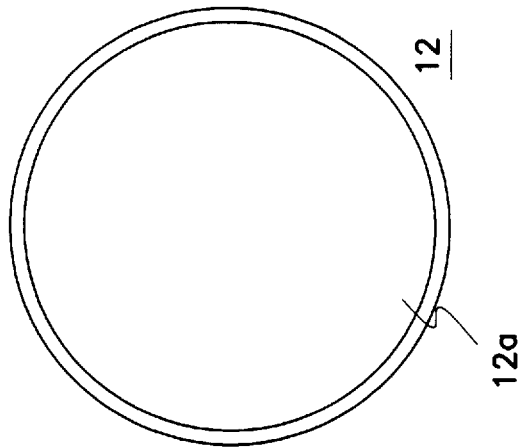
FIG. 2 shows the measurement surface of an exemplary transducer.

Transducer 12 comprises a commercially available device, such as a piezoelectric transducer. As shown in FIG. 2, in the embodiment disclosed herein, transducer 12 has a measurement surface 12a (the transmit/receive surface) that is substantially round in cross section and has a substantially flat surface (the measurement surface). During transmission, measurement surface 12a oscillates at a predetermined frequency (e.g., 200 kHz). During reception, echoes strike surface 12a, causing it to generate an electrical signal in proportion to the frequency of the echo signal. Further details and operation of piezoelectric transducers are well-known to those of ordinary skill in the art. As such, further operational characteristics are omitted from the present description for clarity and brevity.

Figure 3:
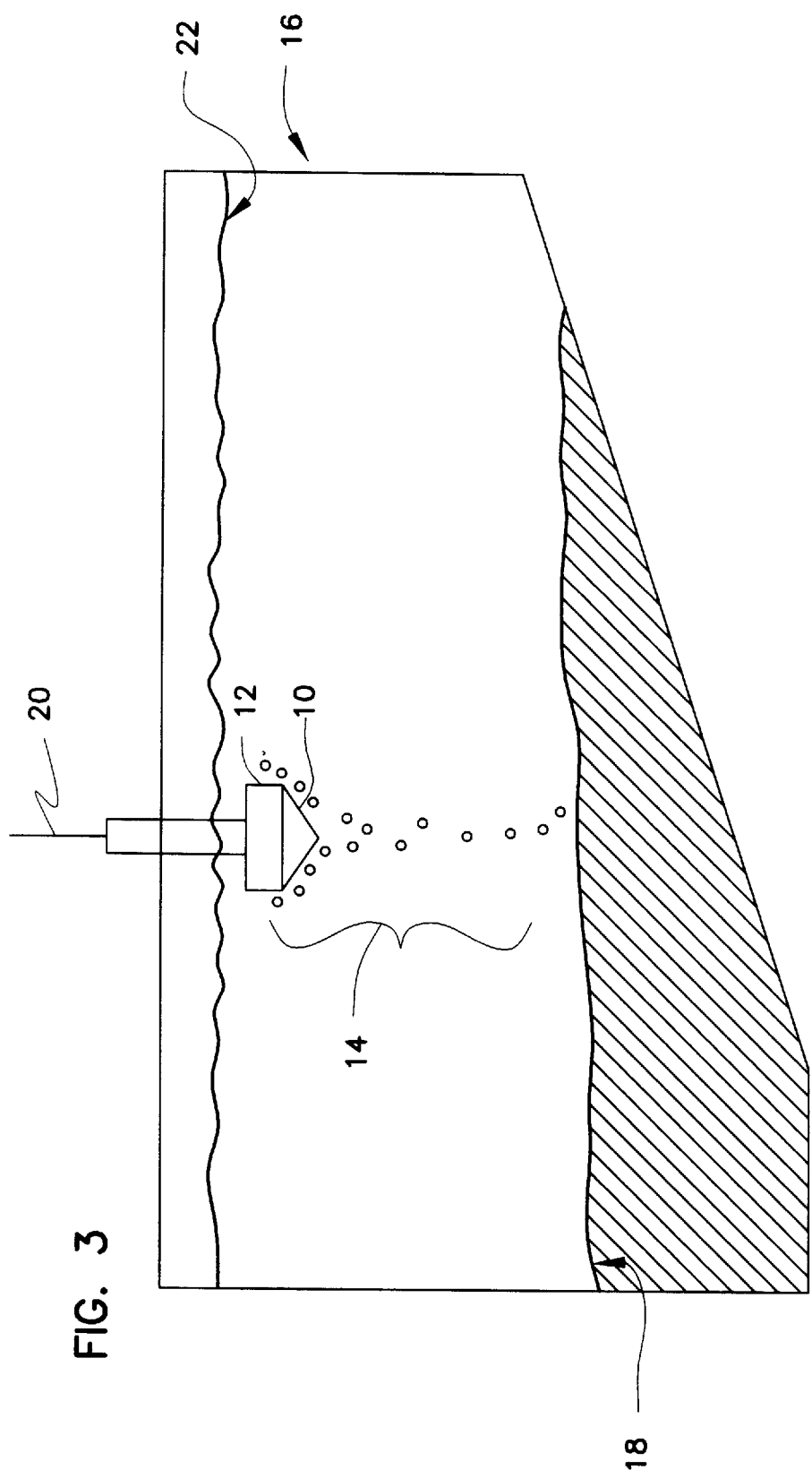
FIG. 3 is a pictorial representation of a portion of a water tank employing a sonic transducer and a transducer shroud in accordance with the present invention; and, FIG. 4 shows the preferred embodiment of the transducer shroud of the present invention attached to a sonic transducer.

FIG. 3 presents a pictorial representation of the water treatment system of FIG. 1, further employing an aspect of the present invention. As with the water treatment system described above, transducer 12 is positioned below air/water interface 22. In FIG. 3, however, a shroud 10 is attached over the transmit/receive surface of transducer 12. The effect of adding shroud 10 to transducer 12 is illustrated by bubbles 14. As the bubbles 14 rise through the water, they strike the inclined surface presented by shroud 10 and are directed harmlessly to the side of transducer 12. As a result, transducer 12 continues to operate consistently without the threat of bubbles or other rising matter sticking to its transmit/receive surface and subsequently interfering with the measurement.

FIG. 4 depicts a presently preferred embodiment of transducer shroud 10 in attachment with transducer 12. As shown, the shroud is conical in shape, with the base of the cone attached over the receiving surface of transducer 12. A lip 10a is formed at the base of the cone to provide sufficient area for attachment to the transducer. As noted above the shroud presents at least one inclined surface to any rising bubbles or other matter. The conic embodiment presents the inclined surface by providing an angle $\alpha$ (hereinafter the "attack angle") of about 15° to 25° as measured between the line A, which is parallel to the cone axis, and the slant height line. The diameter of the cone is dictated by the diameter of the transducer. Essentially, the cone diameter will be adapted to completely cover the transmit/receive surface of the transducer. Accordingly, the height of the cone is dictated by the diameter and the attack angle that is selected.

The shroud may be formed of a solid acoustically transparent material or a filled shell. In the shell embodiment, the shell is preferably made of a thin layer of Teflon® based polyvinyl chloride (PVC) and is filled with a material having acoustic characteristics as close as possible to the contents of the tank (e.g., water). For example, in an embodiment wherein the transducer is to be used in a water tank, the shell is fill with acoustic rubber, such as Rho-C (product #35065B or 35075B) manufactured by B.F. Goodrich. Alternatively, the shell could be filled with other material substantially acoustically transparent in water, such as beeswax or even water itself. In other applications, where an acoustic match may not be readily available, the transducer may be filled directly with a sample of the native tank material, ensuring a close acoustic match.

Those skilled in the art will appreciate that although the present embodiment discloses a conic shaped transducer shroud, other shapes are possible that perform the function of directing bubbles and other particulates away from the surface of transducer 12. For example, a pyramid, a hemisphere or a wedge are all possible shapes that could be employed instead of the conic shape disclosed herein. Furthermore, the hollow jacket could be made of material other than PVC. For example, the shroud could be formed directly from acoustic rubber, in which case, the shell could be eliminated altogether.

The present invention may be embodied in other specific forms without departing from the spirit or essential attributes thereof. For example, those skilled in the art will appreciate that the conic shroud described herein could be used in the measurement of sludge in the treatment of potable water. Accordingly, reference should be made to the appended claims, rather than to the foregoing specification, as indicating the scope of the invention.

What I claim is:

1. An apparatus for making sonic measurements in a fluid filled tank, comprising:

a sonic transducer having a measurement surface;

a substantially acoustically transparent shroud coupled to said sonic transducer, said shroud having at least one inclined surface for directing rising bubbles and other matter away from said measurement surface wherein said shroud is filled with an acoustically transparent material, said material comprising the fluid from the fluid filled tank.

2. The apparatus as recited in claim 1 wherein said shroud shape is one of substantially pyramidal, substantially hemispheric and substantially wedge shaped.

3. The apparatus as recited in claim 1 wherein said shroud is substantially conical.

4. The apparatus as recited in claim 3 wherein said conical shroud has an attack angle in the range of 15 to 25 degrees.

5. The apparatus as recited in claim 1 wherein said shroud comprises acoustic rubber.

6. The apparatus as recited in claim 1 wherein said shroud comprises a polyvinyl chloride shell and a substantially acoustically transparent filling.

7. The apparatus as recited in claim 6 wherein said filling comprises one of acoustic rubber and water.

8. A shroud for covering for a sonic transducer submersible in a waste water treatment tank containing waste water, comprising:
- an attachment surface located at a base of the shroud for attaching said shroud to a transmission/reception surface of the sonic transducer;
- a shunting surface coupled to said attachment surface, said shunting surface forming an attack angle with respect to a plane substantially parallel to an interface between the waste water and air.

9. The shroud as recited in claim 8, wherein said shunting surface is substantially conical.

10. The shroud as recited in claim 8 wherein said attack angle is between 15 and 25 degrees, said attack angle being measured from a plane perpendicular to the interface plane.

11. The shroud as recited in claim 8 wherein said shroud comprises a substantially acoustically transparent material.

12. The shroud as recited in claim 11 wherein said acoustically transparent material comprises acoustic rubber.

13. The shroud as recited in claim 8 wherein said shroud comprises a shell filled with substantially acoustically transparent material.

14. A system for measuring sludge levels in a waste water treatment tank, comprising:
- a sonic transducer for measuring an echo signal indicative of sludge levels in the tank;
- a substantially conically shaped shroud attached to a measurement surface of said sonic transducer, said shroud comprising a substantially acoustically transparent material.

* * * * *